UNITED STATES PATENT OFFICE.

CLARENCE I. ROBINSON, OF STATEN ISLAND, NEW YORK, ASSIGNOR TO STANDARD OIL COMPANY, OF BAYONNE, NEW JERSEY, A CORPORATION OF NEW JERSEY.

PURIFYING HYDROCARBON OILS.

1,387,868.  Specification of Letters Patent.  Patented Aug. 16, 1921.

No Drawing.  Application filed March 13, 1920. Serial No. 365,617.

*To all whom it may concern:*

Be it known that I, CLARENCE I. ROBINSON, a citizen of the United States, residing at Staten Island, in the county of Richmond and State of New York, have invented a new and useful Improvement in Purifying Hydrocarbon Oils, of which the following is a specification.

The present invention relates to the further purification of petroleum oils or distillate which have been subjected to the action of sulfuric acid for the removal of undesired constituents, and is fully explained in the following specification.

In the treatment of petroleum distillates, and particularly the lubricating fractions, for the manufacture of pale or water-white products, the use of strong and of fuming sulfuric acid results in the formation of sulfonic acid compounds, some of which are soluble in the oil in the presence of the aqueous sludge, and consequently are not removed therewith. When the acid-treated oil is subsequently treated with alkali, the alkali metal compounds or "soaps" of these oil-dissolved sulfonic acids are formed. In washing the acid-treated oils, whether subjected to alkali treatment or not, these dissolved sulfonated compounds cause the formation of more or less permanent emulsions, which are difficult of separation from the oil. It is therefore impractical to remove these sulfonic acids or soaps from the treated oils by the use of water or alkali solutions in the usual manner.

I have now discovered that iso-propyl alcohol and aqueous solutions thereof may be utilized for the removal of oil-dissolved sulfonated compounds, and that the solutions of the sulfonted compounds do not form emulsions with the oils and may be readily separated therefrom by settling. Although substantially pure iso-propyl alcohol may be utilized for the purpose, or a concentrated iso-propyl alcohol containing approximately 92% of the alcohol, I find that very satisfactory results are secured by the use of an aqueous solution of iso-propyl alcohol containing 45% thereof (by volume). The iso-propyl alcohol or solution thereof is added to the acid treated oils, which may have been treated with alkali for the neutralization of the acid, and the mixture agitated. The alcohol or alcohol solution is then permitted to settle out, carrying with it the sulfonated compounds, and is removed from the oil, which may then be filtered or otherwise prepared for the trade.

In illustration of the application of my invention, I may treat a steam distillate lubricating oil fraction of about 28° Bé., 385° F. flash and 215 viscosity (100° F.) first with 5% of sulfuric acid of 66° Bé., and subsequently with 37% of 20% fuming sulfuric acid, each treatment being effected in several dumps, for the production of a water white oil for medicinal use. The treated oil is then treated with caustic soda solution for example, of 10% and is blown bright by forcing air through it. The treated oil contains a small amount of sodium salts of the sulfonated compounds of the oil (1 to 2%, calculated as NaOH). It is next treated with iso-propyl alcohol, for example by mixing it with 20% by volume of a 45% aqueous solution of the alcohol. The mixture is thoroughly agitated, and is allowed to settle. During agitation and settling the oil is slightly warmed, for example, to 140° F. The alcohol, containing the sulfonates in solution, is drawn off. Any alcohol remaining in the oil may be removed, for example, by blowing air through the oil while the latter is slightly heated, for example, to 150° C. The oil may then be filtered, with clay, if desired, and is ready for the market.

The alcohol solution, which contains the sulfonated compounds, may be treated for the recovery of the alcohol, for example, by distillation.

In the above illustration the process of the present invention has been described as applied to an oil which has been subjected to a very "heavy" acid treatment. It is readily apparent that it may also be applied to oils which have been subjected to a less heavy treat, for example, to lubricating oils which have been treated only with 66° Bé. sulfuric acid or to pale or white lubricating oils which have been treated with a less quantity of fuming acid than the medicinal oil above described. The process may likewise be applied to the direct removal of the sulfonic acids from the oil, without neutralization with alkali.

In the above illustration of the process the use of approximately 20% (by volume) of a 45% solution of propyl alcohol has been described. Larger proportions or more concentrated solutions of the alcohol or the pure alcohol itself may be used if desired, but I have found that in general there is not a substantial improvement in the results of the process. If substantially less than 20% of the propyl alcohol be used, say 10 or 15%, or if more dilute alcohol solutions are employed the removal of the sulfonated compounds is not complete, and frequently considerable quantities of oil are entrained in the alcohol solution. The iso-propyl alcohol may contain small amounts of higher alcohols, for example, those containing 4 and 5 carbon atoms derived from the olefins of petroleum still gases, without impairing its effectiveness for use in the present process.

Although the present invention has been described in connection with a specific application thereof, it is intended that this application shall be for the purpose of illustration and clearness, and not to limit the scope of the invention, as described in the accompanying claims.

I claim:

1. The process of purifying acid-treated petroleum oils which consists in admixing iso-propyl alcohol therewith and subsequently separating the iso-propyl alcohol therefrom, thereby removing sulfonated compounds from the oil.

2. The process of purifying acid treated petroleum oils which consists in admixing an aqueous solution of iso-propyl alcohol therewith and subsequently separating the iso-proply alcohol solution therefrom, thereby removing sulfonated compounds from the oil.

3. The process of purifying acid treated petroleum oil distillates which consists in neutralizing said distillates with alkali, then admixing iso-propyl alcohol therewith and subsequently separating the iso-propyl alcohol therefrom, thereby removing sulfonated compounds from the oil.

4. The process of purifying acid treated petroleum oil distillates which consists in neutralizing said distillates with alkali, then admixing iso-propyl alcohol solution therewith and subsequently separating the iso-propyl alcohol therefrom, thereby removing sulfonated compounds from the oil.

5. The process of purifying acid treated petroleum oil distillates which consists in neutralizing said distillates with alkali, then admixing 45% iso-propyl alcohol solution therewith and subsequently separating the iso-propyl alcohol therefrom, thereby removing sulfonated compounds from the oil.

6. The process of purifying acid treated petroleum oil distillates which consists in neutralizing said distillates with alkali, then admixing 20% of 45% iso-propyl alcohol solution therewith and subsequently separating the iso-propyl alcohol therefrom, thereby removing sulfonated compounds from the oil.

7. The process of preparing a refined hydro-carbon oil which consists in subjecting a lubricating oil fraction to successive treatment with concentrated and fuming sulfuric acid, removing and neutralizing the treated oil, admixing therewith 20% of a 45% aqueous iso-propyl alcohol solution, permitting the oil and alcohol solution to separate while maintaining a temperature of about 140° F. and withdrawing the alcohol solution.

8. The process of purifying hydrocarbon oils containing dissolved sulfonated compounds which consists in treating the oil with iso-propyl alcohol, permitting the oil and alcohol solution to separate, thereby removing the sulfonated compounds, and blowing air through the treated oil while maintaining a temperature of about 150° F., thereby removing the alcohol therefrom.

CLARENCE I. ROBINSON.